US008183830B2

(12) United States Patent
Law

(10) Patent No.: US 8,183,830 B2
(45) Date of Patent: May 22, 2012

(54) ADJUSTABLE CHARGER

(75) Inventor: Hung Hi Law, Hong Kong (HK)

(73) Assignee: Keep Smart Trading Limited, Cheung Sha Wan, Kowloon (HK)

( * ) Notice: Subject to any disclaimer, the term of this patent is extended or adjusted under 35 U.S.C. 154(b) by 492 days.

(21) Appl. No.: 12/366,623

(22) Filed: Feb. 5, 2009

(65) Prior Publication Data

US 2010/0194332 A1  Aug. 5, 2010

(51) Int. Cl.
*H02J 7/00* (2006.01)
(52) U.S. Cl. .......................................... 320/110; 320/113
(58) Field of Classification Search .................... 320/107
See application file for complete search history.

(56) References Cited

U.S. PATENT DOCUMENTS

| | | | | |
|---|---|---|---|---|
| 5,206,577 A | * | 4/1993 | Fish | 320/107 |
| 6,049,192 A | * | 4/2000 | Kfoury et al. | 320/113 |
| 6,710,576 B1 | * | 3/2004 | Kaufman et al. | 320/107 |
| 7,446,502 B2 | * | 11/2008 | Tong | 320/110 |
| 7,626,357 B2 | * | 12/2009 | Hoffman et al. | 320/110 |
| 7,812,566 B2 | * | 10/2010 | Chen | 320/110 |
| 2001/0008373 A1 | * | 7/2001 | Kim | 320/113 |
| 2006/0170393 A1 | * | 8/2006 | Yang | 320/107 |
| 2008/0143294 A1 | * | 6/2008 | Phelps et al. | 320/110 |

OTHER PUBLICATIONS

Universal Serial Bus 3.0 Specification, Hewlett-Packard Company, Revision 1.0, Nov. 12, 2008, p. 434.*

* cited by examiner

*Primary Examiner* — Ramy Ramadan
(74) *Attorney, Agent, or Firm* — Tsz Lung Yeung

(57) ABSTRACT

An adjustable charger for compatibly charging at least one rechargeable alkaline battery and at least one first rechargeable battery includes a charger housing and an adjustable charging arrangement. The adjustable charging arrangement includes an upper charging platform, a lower charging platform, and a charging circuitry. The upper charging platform is formed on the top charging side of the charger housing for fittedly and adjustably receiving one of the alkaline battery and the first rechargeable battery in the first charging slot. The lower charging platform is also formed on the top charging side of the charger housing at a position underneath the upper charging platform for fittedly and adjustably receiving another of the alkaline battery and the first rechargeable battery in the second charging slot.

15 Claims, 9 Drawing Sheets

ADJUSTABLE CHARGER

BACKGROUND OF THE PRESENT INVENTION

1. Field of Invention

The present invention relates to a charger, and more particularly to an adjustable charger which comprises an adjustable charging arrangement for simultaneously or selectively charging two or more rechargeable batteries on merely one predetermined side of the adjustable charger.

2. Description of Related Arts

A conventional charger for charging a rechargeable dry cell or a first rechargeable battery usually comprises a main housing and a plurality of charging slots spacedly formed on the main housing for receiving the corresponding type of battery (i.e. the rechargeable dry cell or the first rechargeable battery) within the charging slots. There exist a number of disadvantages for conventional chargers.

Very often, a particular conventional charger is designed for charging only a single predetermined type of battery. For example, a conventional charger may only be designed to charge a rechargeable dry cell or a first rechargeable battery. When a user has both the rechargeable dry cells and the first rechargeable battery, he or she has to buy separate chargers in order to accomplish the relevant charging process.

There exist a limited number of chargers which are capable of charging both dry cells and lithium-ion batteries. The main disadvantage is that most of these chargers are meant to recharge a certain predetermined kind of first rechargeable battery plus a certain amount of dry cells. As a result, when the user has different lithium-ion batteries serving different purposes, he or she still has to purchase different battery chargers for charging different types of batteries, including different types of lithium-ion batteries.

Furthermore, such battery chargers suffer a notorious disadvantage that they are usually bulky in size. This may due to the fact that placing lithium-ions batteries and traditional rechargeable batteries (i.e. the rechargeable dry cells) into a single charger housing requires an inherently bigger volume of the charger housing. This converts to a correspondingly larger size of the overall battery charger. This inherent disadvantage of this particular type of conventional chargers severely undermines the advantage they bring to the traditional charger market, i.e. bringing consumers the convenience of having one battery chargers for charging both the first rechargeable battery and conventional rechargeable alkaline batteries (i.e. the dry cells). Users get the convenience of using a single battery charger for charging two different types of batteries in exchange of having a bulkier charger. Now consumer may think that they may not need a single battery charger because that one is much bigger than any one of the separate chargers for conventional alkaline rechargeable batteries and the first rechargeable battery charger.

Finally, most conventional chargers of this type are not capable of charging different kind of lithium-ion batteries so that when users have to buy different chargers for chargers different lithium-ion batteries even though each of these chargers can also recharge conventional rechargeable alkaline batteries (i.e. the dry cells).

SUMMARY OF THE PRESENT INVENTION

A main object of the present invention is to provide an adjustable charger comprising an adjustable charging arrangement which is capable of simultaneously or selectively charging at least one rechargeable battery (or two or more rechargeable batteries such as one rechargeable alkaline battery and one lithium-ion battery) on merely one predetermined side of the adjustable charger.

Another object of the present invention is to provide an adjustable charger comprising an adjustable charging arrangement which is capable of simultaneously charging at least one alkaline battery (i.e. a dry cell) or a lithium-ion rechargeable battery on one predetermined side of the adjustable charger so as to allow an overall size of the adjustable charger to be kept to the minimum.

Another object of the present invention is to provide an adjustable charger comprising an adjustable charging arrangement, wherein the adjustable charger can obtain electrical power through conventional AC source or from a USB port. In other words, the adjustable charger of the present invention is adapted to provide charging capability in a wide variety of circumstances.

Another object of the present invention is to provide an adjustable charger comprising an adjustable charging arrangement, which is capable of charging different kinds of lithium-ion batteries having different sizes. In other words, a single adjustable charger of the present invention can be conveniently adjusted for charging a wide variety of lithium-ion batteries and traditional alkaline rechargeable batteries (i.e. rechargeable dry cells).

Another object of the present invention is to provide an adjustable charger comprising an adjustable charging arrangement, wherein the adjustable charger is also capable of individually charging the first and the second (or more) rechargeable batteries.

Accordingly, in order to accomplish the above objects, the present invention provides an adjustable charger for compatibly charging at least one rechargeable alkaline battery and at least one first rechargeable battery, comprising:

a charger housing having a top charging side; and an adjustable charging arrangement, which comprises:

an upper charging platform formed on the top charging side of the charger housing, wherein the upper charging platform has first charging terminal and contains at least first charging slot for fittedly and adjustably receiving one of the alkaline battery and the first rechargeable battery in the first charging slot; and a lower charging platform formed on the top charging side of the charger housing at a position underneath the upper charging platform, wherein the lower charging platform has second charging terminal and contains at least second charging slot for fittedly and adjustably receiving another of the alkaline battery and the first rechargeable battery in the second charging slot; and a charging circuitry disposed in the charging housing to electrically connect with the first and the second charging terminals, wherein the alkaline battery and the first rechargeable battery are fittedly and detachably disposed in the first and the second charging slots for being simultaneously or individually and selectively recharged.

The above mentioned objectives, features, and advantages of the present invention will be more clearly described and shown in the following detailed description, drawings, and the claims.

DETAILED DESCRIPTION OF THE PREFERRED EMBODIMENT

Figure 1A:
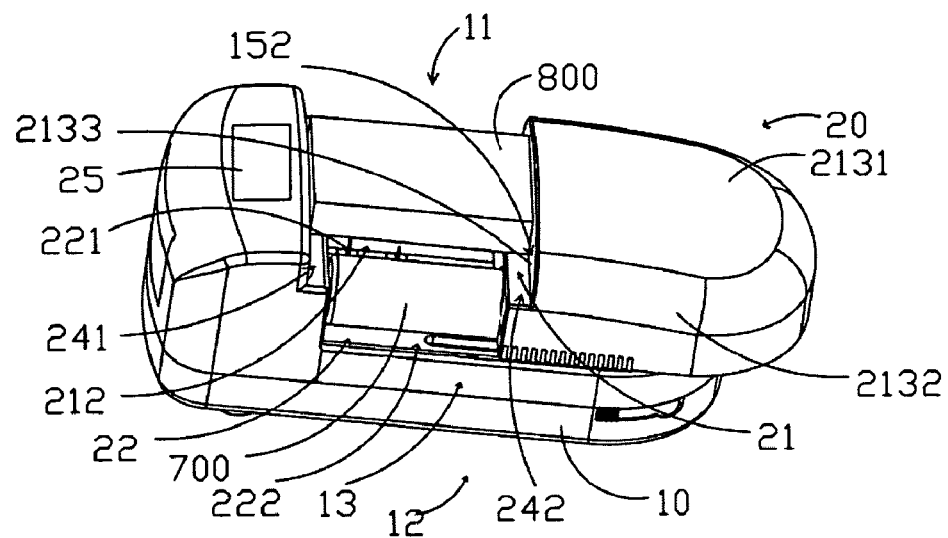
FIG. 1A to FIG. 1D are perspective views of an adjustable charger according to a preferred embodiment of the present invention.
Figure 1B:
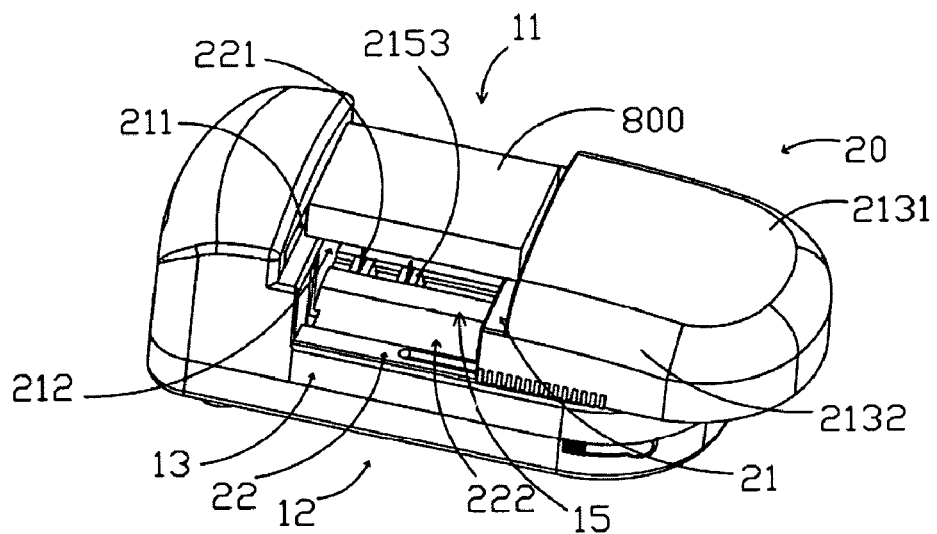
Figure 1C:
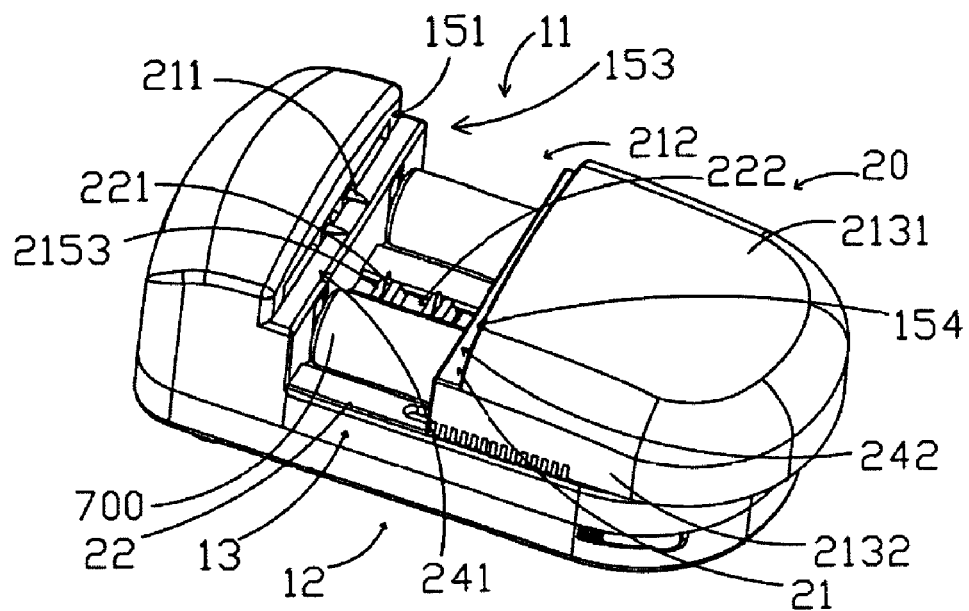

Referring to FIG. 1A to FIG. 1D, FIG. 2A, FIG. 2B and FIG. 3A to FIG. 3D of the drawings, an adjustable charger according to the preferred embodiment of the present invention is illustrated. The adjustable charger is for simultaneously or selectively charging a first and a second rechargeable battery, which for the purpose of explicating the features of the present invention, are embodied as a rechargeable lithium-ion battery 800 and a rechargeable alkaline battery 700 (such as a typical AA rechargeable dry cell) respectively. Note that the rechargeable alkaline battery 700 and the rechargeable lithium-ion battery 800 are examples of the second and the first rechargeable battery respectively. Other conventional types of rechargeable batteries are also included within the meaning of the first and the second rechargeable batteries. The adjustable charger comprises a charger housing 10, and an adjustable charging arrangement 20.

The charger housing 10 has a top charging side 11, bottom standing side 12, and at least one (preferably four) peripheral side 13 extended between the top charging side 11 and the bottom standing side 12 for forming a substantially quadrilateral cross section of the charger housing 10.

On the other hand, the adjustable charging arrangement 20 comprises an upper charging platform 21, a lower charging platform 22, and a charging circuitry 23, wherein the upper charging platform 21 is formed on the top charging side 11 of the charger housing 10, wherein the upper charging platform 21 has first charging terminals 211 and contains at least first charging slot 212 for fittedly and adjustably receiving one of the alkaline battery 700 and the rechargeable lithium-ion battery 800 in the first charging slot 212. According to the first preferred embodiment shown in FIG. 1A of the drawings, the upper charging platform 21 is adapted for charging the rechargeable lithium-ion battery 800 so that the first charging slot 212 is adjustably shaped and sized to receive a rechargeable lithium-ion battery 800 of various sizes.

The lower charging platform 22 is also formed on the top charging side 11 of the charger housing 10 at a position underneath the upper charging platform 21, wherein the lower charging platform 22 has second charging terminal 221 and contains at least second charging slot 222 for fittedly and adjustably receiving another of the or the remaining alkaline battery 700 and the rechargeable lithium-ion battery 800 in the second charging slot 222. According to the preferred embodiment of the present invention, the lower charging platform 22 is adapted for charging the rechargeable alkaline battery 700, such as a typical rechargeable AA/AAA alkaline battery, so that the second charging slot 222 is adjustably shaped and sized to receive an alkaline battery 700 thereinto.

The charging circuitry 23 is disposed in the charger housing 10 to electrically connect with the first and the second charging terminals 211, 221, wherein the alkaline battery 700 and the rechargeable lithium-ion battery 800 are fittedly and detachably disposed in the first and the second charging slots 221, 222 for being simultaneously or individually and selectively recharged. It is important to mention, however, that the first and the second rechargeable batteries can also be separately and individually recharged without also charging the other rechargeable batteries. For example, the adjustable charger can charge either the first or the second rechargeable batteries, or simultaneously changing both rechargeable batteries.

As shown in FIG. 1A to FIG. 1D and FIG. 2A and FIG. 2B of the drawings, the charger housing 10 further has a receiving cavity 14 formed therein for receiving the charging circuitry 23, and a retention cavity 15 indently formed on the top side 11 of the charger housing 10 to communicate with the receiving cavity 14, wherein the first and the second charging slots 212, 222 are formed within the retention cavity 15 for fittedly yet adjustably receiving the rechargeable alkaline battery 700 and the rechargeable lithium-ion battery 800 within the first and the second charging slots 212, 222 respectively. The lower charging platform 22 further has a third charging slot 223 formed side-by-side with the second charging slot 222 for receiving an additional rechargeable alkaline battery 700. It is worth mentioning that, within the limit of the size of the charger housing 10, the lower charging platform 22 can actually have a plurality (not only two) of charging slots (including the second charging slot 222 and the third charging slot 223, so on and so forth) for charging a corresponding number of rechargeable alkaline batteries 700 in addition to the rechargeable lithium-ion battery 800 (the first rechargeable battery) charged on the upper charging platform 21.

In order to retain the rechargeable lithium-ion battery 800 in the first charging slot 212, the adjustable charging arrangement 20 further comprises a retention arrangement 24 formed on two sidewalls of the retention cavity 15 for retaining the rechargeable lithium-ion battery 800 within the first charging slot 212 without falling onto the lower charging platform 22. More specifically, the retention arrangement 24 contains at least first and second retention surfaces 241, 242 inwardly extended at two inner sidewalls (first and second sidewall 151, 152) of the retention cavity 15 wherein two side end portions of the rechargeable lithium-ion battery 800 are arranged to place onto the two retention surfaces 241, 242 respectively for being held in position within the first charging slot 212 and without falling onto the lower charging platform 22. According to the preferred embodiment of the present invention, a length of an upper portion of the retention cavity 15 is longer than a length of a lower portion of the retention cavity 15 so as to form a first shoulder 153 between the upper portion and the lower portion of the retention cavity 15 at the first sidewall 151 thereof, wherein the first retention surface 241 is formed as an upper surface of the first shoulder 153 for supporting the corresponding end portion of the rechargeable lithium-ion battery 800.

The upper charging platform 21 further comprises an adjusting member 213 slidably mounted at the top charging side 11 of the charger housing 10 to slidably adjust a size of the first charging slot 212 for fittedly receiving the rechargeable lithium-ion battery 800 of differing sizes within the first charging slot 212. More specifically, the adjusting member 213 is slidably mounted on the top charging side 11 of the charger housing 10 in such a manner that it is capable of slidably displacing between an idle position and a charging position, wherein in the idle position, the adjusting member 213 is inwardly biased (preferably by a resilient element 214 mounted in the charger housing 10) to reduce the size to the first charging slot 212 to its minimum and to minimize an overall size of the adjustable charger, wherein in the charging position, the adjusting member 213 is outwardly pulled to slide on the top charging side 11 of the charger housing 10 to increase the size of the first charging slot 212 for fittedly receiving a corresponding rechargeable lithium-ion battery 800. In other words, the size of the retention cavity 15 varies according to the size of the first through third charging slots 212, 222, 223 as adjusted by the adjusting member 213. As such, when the adjusting member 213 is at the charging position, the adjusting member 213 is outwardly slid to form a second shoulder 154 of the retention cavity 15, wherein the second retention surface 242 is formed as an upper surface of the second shoulder 154 for supporting the corresponding end portion of the rechargeable lithium-ion battery 800.

The upper charging platform 21 further comprises a terminal adjusting arrangement 215 provided on the charger housing 10 for adjustably aligning the first charging terminals 211 with at least one battery terminal of the rechargeable lithium-ion battery 800, wherein the terminal adjusting arrangement 215 contains first and second sliding tracks 2151, 2152 formed on a bottom surface 155 of the retention cavity 15 and the first sidewall 151 of the retention cavity 15 respectively, and comprises first and second terminal holders 2153, 2154 slidably mounted on the first and the second sliding tracks 2151, 2152 respectively, wherein the first charging terminals 211 are movably mounted to the first or the second terminal holders 2153, 2154 respectively so as to slidably displace along the first and the second sliding tracks 2151, 2152 for aligning with at least one battery terminal of the rechargeable lithium-ion battery 800.

It is worth mentioning that the terminal holders 2153, 2154 may be manually slid to a corresponding position to align with the battery terminal of the first rechargeable battery 800. Alternative, each of the terminal holders 2153, 2154 can have an adjusting handle (i.e. a first adjusting handle 2155 and a second adjusting handle 2155 respectively) extended out of the charger housing 10 for allowing a user to adjust the position of the corresponding terminal holders 2153, 2154 respectively.

Figure 1D:
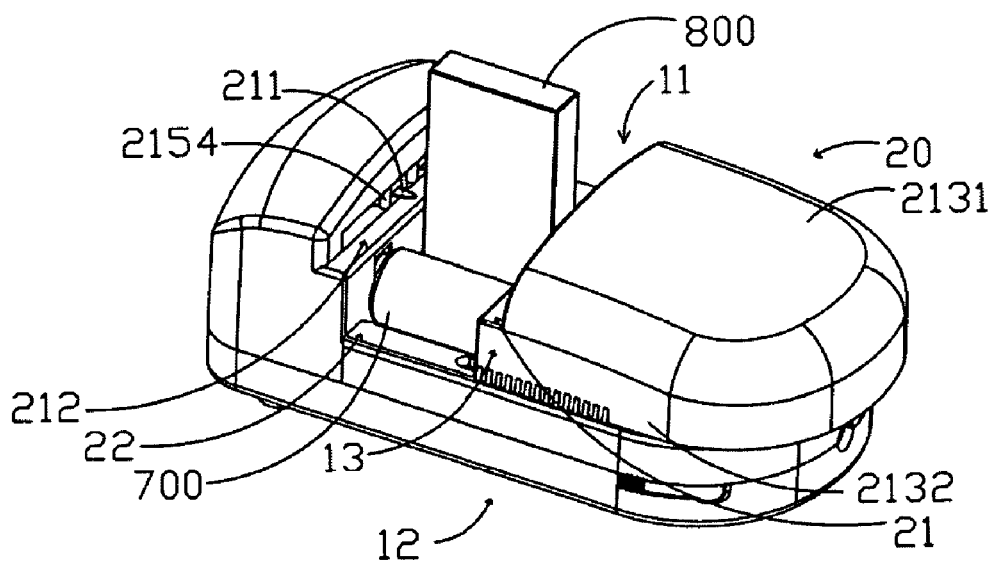
Figure 2A:
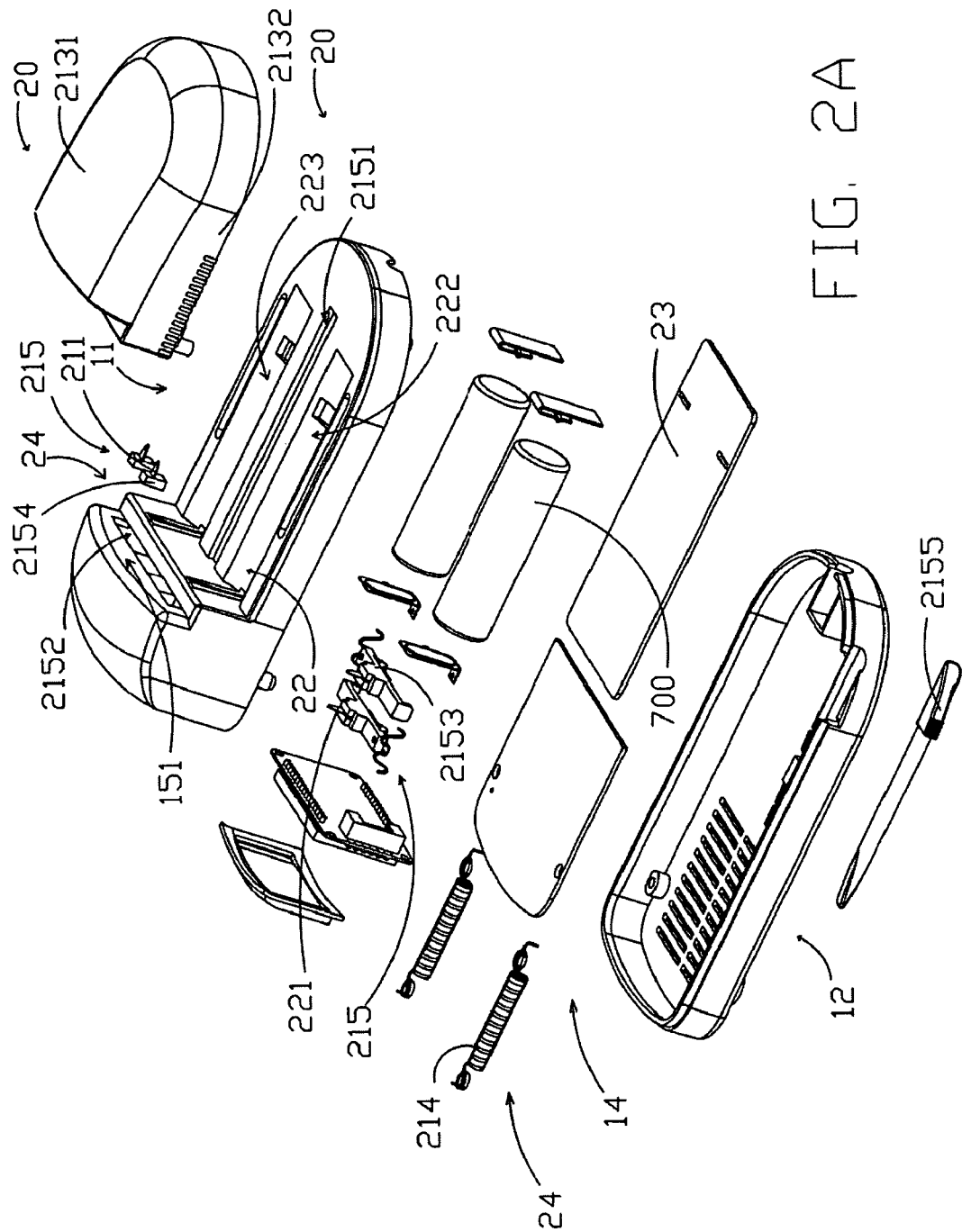
FIG. 2A and FIG. 2B are exploded perspective views of the adjustable charger according to the preferred embodiment of the present invention.
Figure 2B:
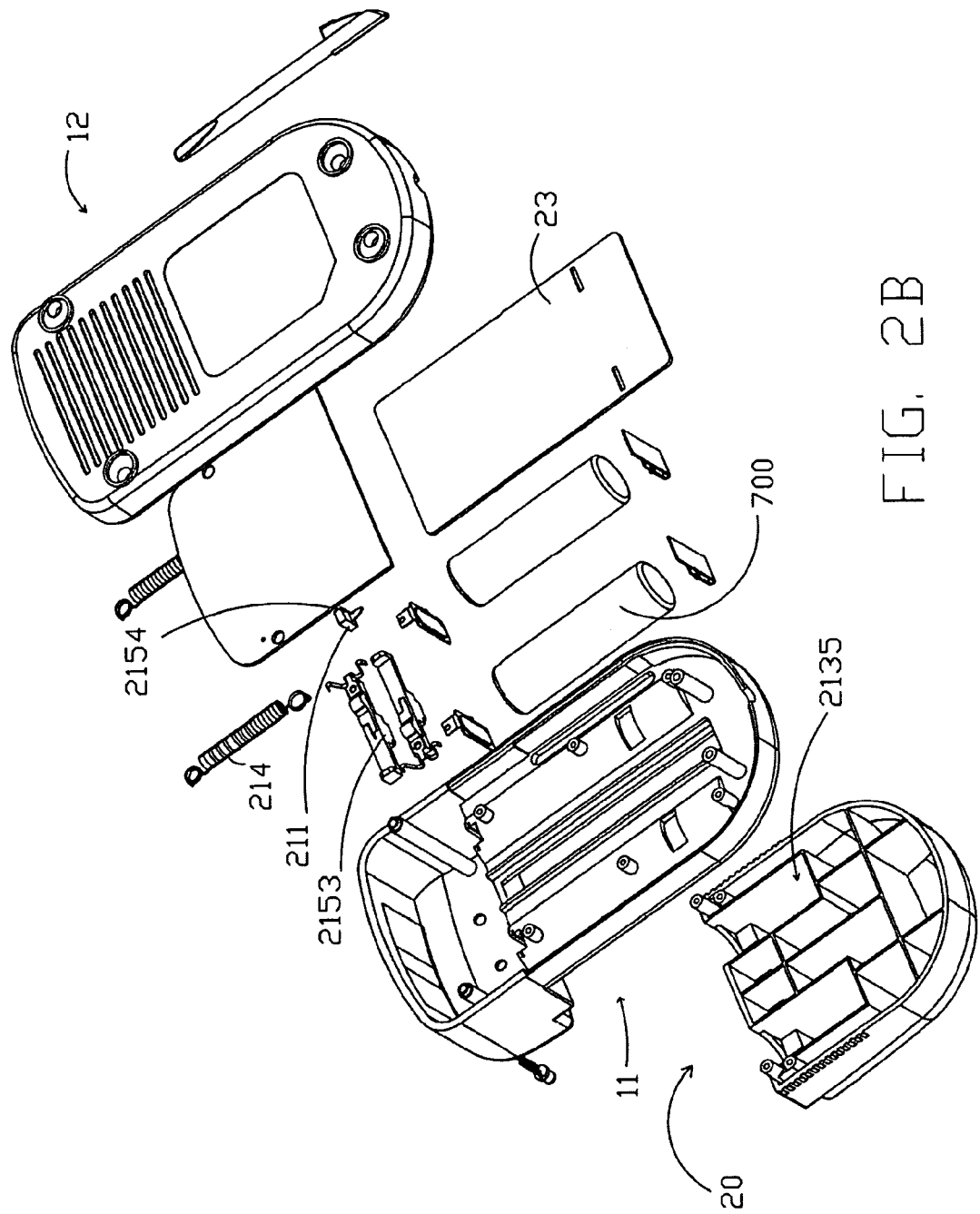
Figure 3A:
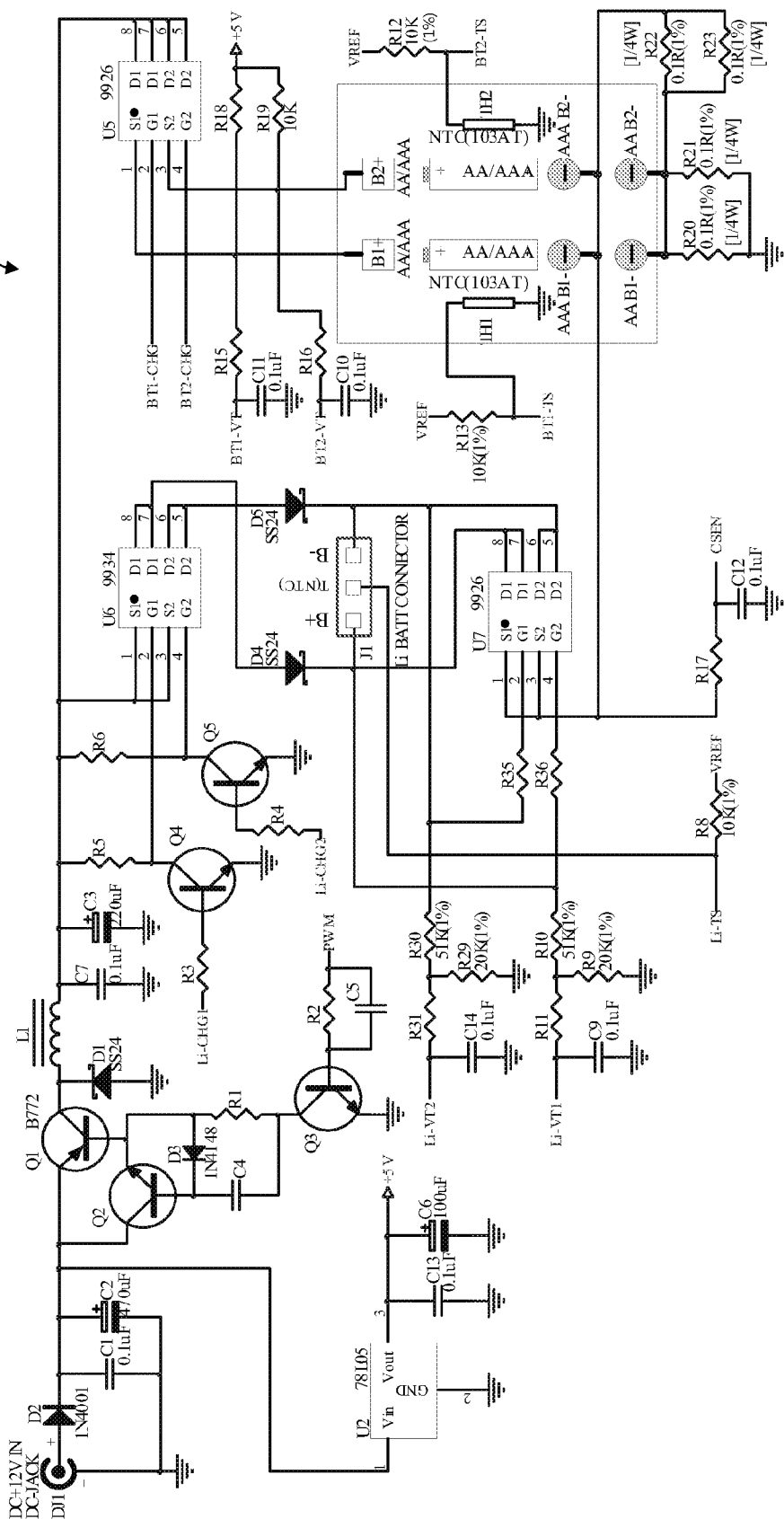
FIG. 3A to FIG. 3D are circuit diagrams of the charging circuitry according to the preferred embodiment of the present invention.
Figure 3B:
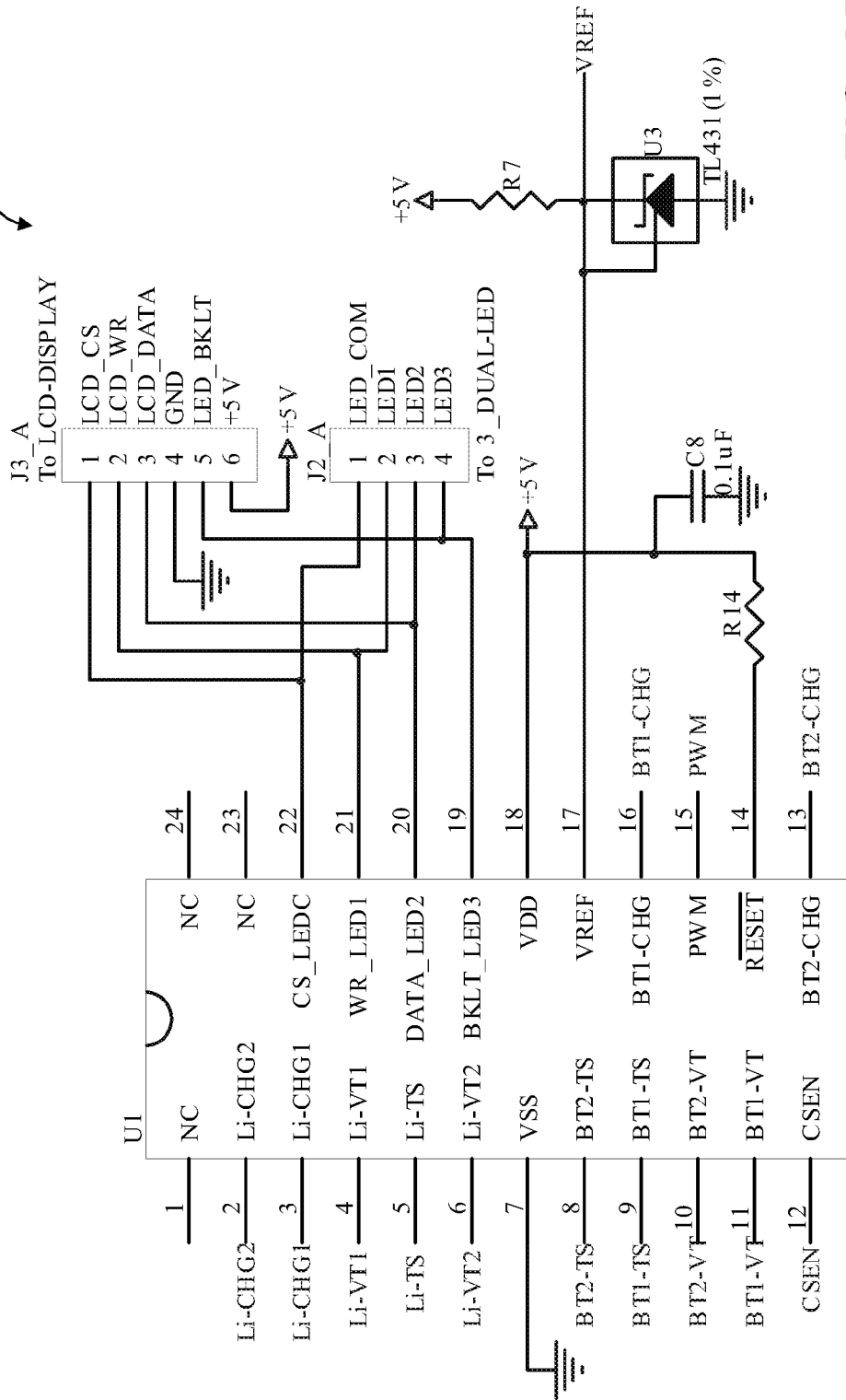
Figure 3C:
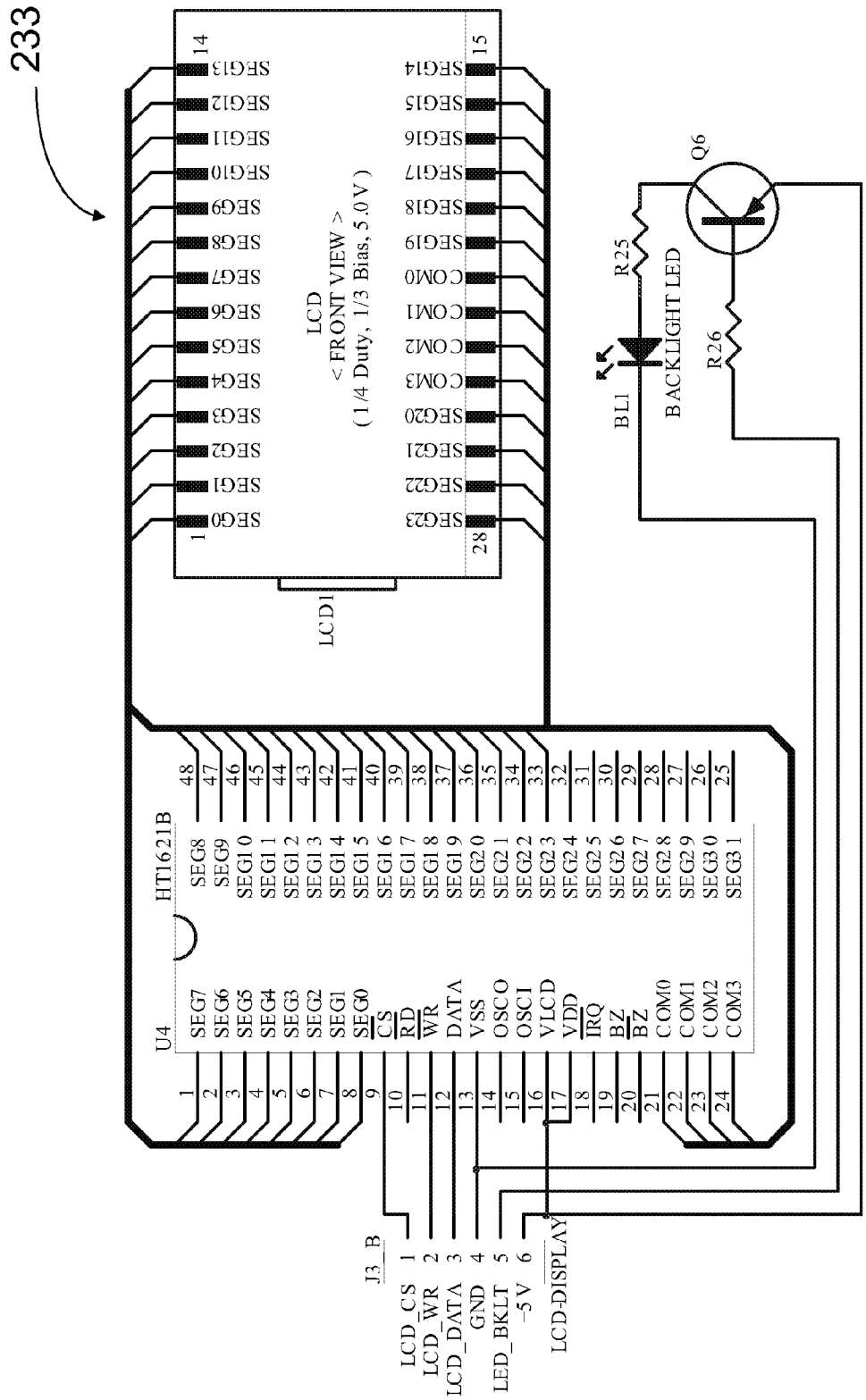
Figure 3D:
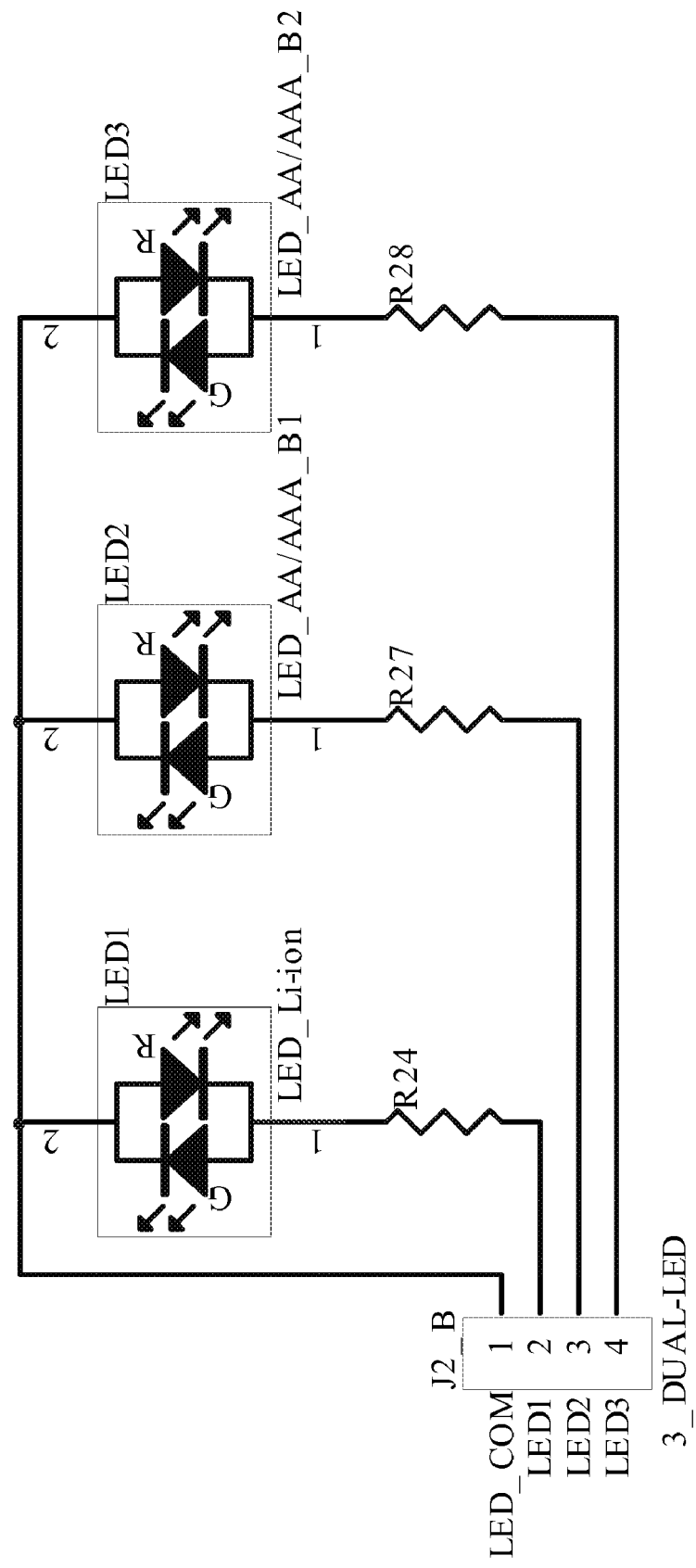

According to the preferred embodiment of the present invention, the rechargeable lithium-ion battery 800 can be disposed in the first charging slot 212 in three different ways. Referring to FIG. 1A of the drawings, the first rechargeable battery 800 can be supported by the retention shoulder 24 in such a manner that a longitudinal edge of the rechargeable lithium-ion battery 800 substantially aligns with a longitudinal edge of the charger housing 10. Alternatively, the rechargeable lithium-ion battery 800 can be supported by the retention shoulder 24 in such a manner that a longitudinal edge of the rechargeable lithium-ion battery 800 substantially aligns with a transverse edge of the charger housing 10. Alternatively, as shown in FIG. 1D of the drawings, the rechargeable lithium-ion battery 800 can be supported by the charger housing 10 in such a manner that the rechargeable lithium-ion battery 800 is arranged to stand on the lower charging platform 22 (i.e. the bottom surface 155 of the retention cavity 15) while two sides of the rechargeable lithium-ion battery 800 are engaged with two sidewalls 151, 152 of the retention cavity 15 respectively. The user may, according to the position of the battery terminal, adjust the position of the first charging terminals 211 to align with the battery terminal of the rechargeable lithium-ion battery 800.

As shown in FIG. 1A to FIG. 1D, FIG. 2A, FIG. 2B to FIG. 3A to FIG. 3D of the drawings, the adjusting member 213 is embodied as an adjusting cover having a curved top panel 2131, two side panels 2132 downwardly and integrally extended from peripheral side edges of the curved top panel 2131 to form a substantially hollow structure within the adjusting member 213, wherein the adjusting member 213 further has a predetermined number of passage slots 2135 formed thereon to align with the second and third charging slots 222, 223 so that a corresponding number of rechargeable alkaline batteries 700 can be disposed into the second and the third charging slots 222, 223 and pass through the corresponding passage slots 2135 without being blocked by the adjusting member 213. Moreover, the adjusting member 213 is arranged to slide on the top charging side 11 of the charger housing 10 at a position above the rechargeable alkaline batteries 700 disposed into the second and the third charging slots 222, 223 respectively.

The adjustable charging arrangement 20 may further comprise a display 25 (as shown in FIG. 1A) provided on the charger housing 10 and electrically connected with the charging circuitry 23 for displaying a charging status of the first rechargeable battery 800 and the rechargeable alkaline batteries 700. Each of the first and the second rechargeable batteries (or more) can also be individually recharged (although at the same time) so that the charging process for each of the rechargeable batteries may end at different times. This feature is pre-designed in the charging circuitry 23. Accordingly, the display 25 is also adapted for displaying the charging status of each individual rechargeable battery. This feature serves to minimize any adverse effect on the rechargeable batteries when the same recharging operation (i.e. the recharging start time and end time) is provided for all rechargeable batteries regardless of their charging status, such as those employed in conventional battery chargers. The adjustable charger of the present invention does not share this problem, because each rechargeable battery is individually recharged and can be attached into or detached from the adjustable charger at any time, irrespective of the charging status of any other rechargeable battery. As a result, as shown in FIG. 3A to FIG. 3D of the drawings, the charging circuitry 23 contains a main charging module 231, a charger control module 232, a display control module 233, and indicator control module 234 for controlling the main charging process, of the adjustable charger, the display 25, and any LED indicator provided on the main housing 10. Note that the main charging module 231, a charger control module 232, a display control module 233, and indicator control module 234 are incorporated into one single circuit board as shown as the charging circuitry 23. However, they can also be provided in the main housing 10 separately.

Finally, it is worth mentioning that the adjustable charger is adapted for electrically connecting with and AC power source, preferably through a power plug, for acquiring electricity to recharge the rechargeable lithium-ion battery 800 and the rechargeable alkaline batteries 700 disposed within the first through third charging slots 212, 222, 223 respectively.

Figure 4:
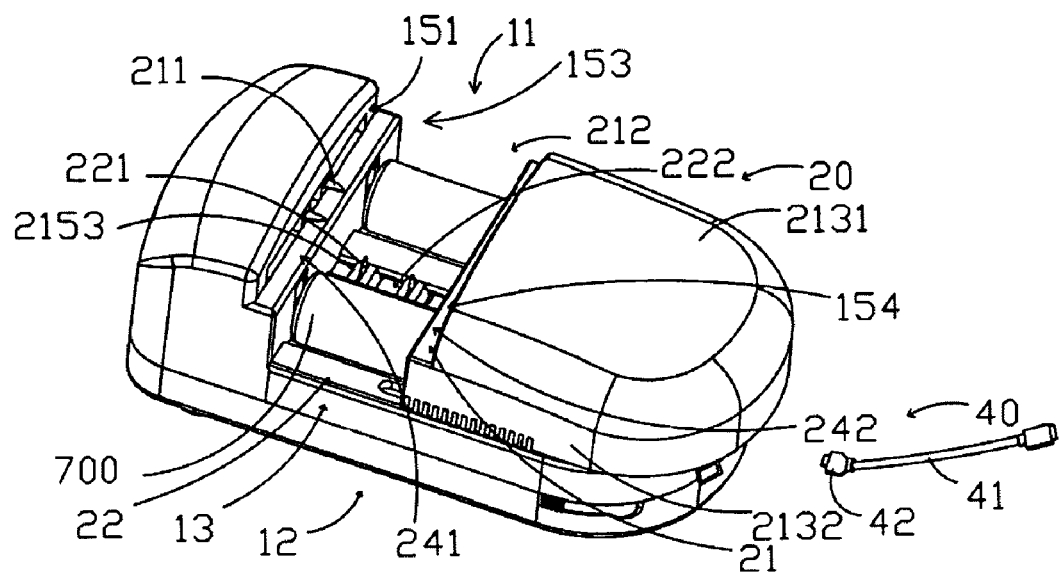
FIG. 4 is first alternative mode of the adjustable charger according to the preferred embodiment of the present invention.

Referring to FIG. 4 of the drawings, an alternative mode of the adjustable charger according to the preferred embodiment of the present invention is illustrated. The first alternative mode is similar to the preferred embodiment, except that the adjustable charger further comprises a USB charging arrangement 40 provided on the charger housing 10 for allowing the charging circuitry 23 to acquire electricity via a conventional USB port, such as a USB port in a desktop computer.

More specifically, USB charging arrangement 40 further comprises a USB plug 42 and a USB cord 41 flexibly connecting between the charger housing 10 and the USB plug 42 so as to extend the USB plug 42 to an external USB socket, such as a USB socket in a desktop computer. It is worth mentioning that the USB cord 41 can be attached onto the charger housing 10 or it can be detachable from the charger housing 10 so as to reduce the adjustable charger into a compact portable accessory. Moreover, the USB charging arrangement 40 may further comprise a retraction device provided on the charger housing 10 to connect with the USB cord 41 in such a manner that the retraction device is adapted to extend the USB cord 41 away from the charger housing 10 and retract the USB cord 41 back to the charger housing 10.

It is worth mentioning that the charging circuitry 23 is adapted to raise the voltage of a typical USB electrical supply voltage of approximately 4.2V to approximately 5.5V for charging first rechargeable battery 800 having such a high capacity. For a conventional USB port, the output voltage is typically approximately 4.2V, thereby merely capable of charging a lithium battery pack having two rechargeable lithium batteries of 4.2V each (i.e. 8.4V for the entire battery pack). For the present invention, however, the adjustable charger of the present invention is capable of recharging not only cellular phone batteries, but also batteries for camcorders, digital cameras and the likes having a charging voltage of up to 11V (for a battery pack having two lithium battery of 5.5V each). In short, the adjustable charger of the present invention can be utilized for charging rechargeable lithium-ion batteries 800 of most, if not virtually all, foreseeable portable electronic devices which one uses in an outdoor environment for self-enjoyment.

Figure 5:
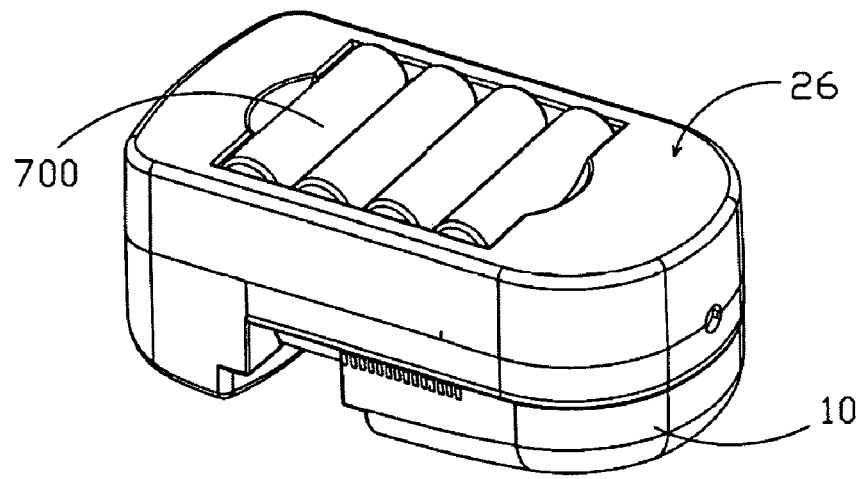
FIG. 5 is second alternative mode of the adjustable charger according to the preferred embodiment of the present invention.

Referring to FIG. 5 of the drawings, a second alternative mode of the adjustable charger according to the preferred embodiment of the present invention is illustrated. The second alternative mode is similar to the preferred embodiment except that the adjustable charging arrangement 20 further has a plurality of additional charging slots 26 formed on a bottom standing side 12 of the charger housing 10 for fittedly receiving and charging additional rechargeable alkaline batteries 700. As a result, the adjustable charger of the present invention is capable of simultaneously charging more rechargeable alkaline batteries.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adjustable charger for compatibly charging at least first and second rechargeable battery, comprising:
   a charger housing having a top charging side and a retention cavity indently formed on said top side of said charger housing; and
   an adjustable charging arrangement, which comprises:
   an upper charging platform formed on said top charging side of said charger housing, wherein said upper charging platform has first charging terminal and contains at least first charging slot for fittedly and adjustably receiving one of said first rechargeable and said second rechargeable battery in said first charging slot, wherein said first charging terminal is for electrically connecting with at least one battery terminal of said corresponding rechargeable battery; and
   a lower charging platform formed on said top charging side of said charger housing at a position overlappedly underneath said upper charging platform, wherein said lower charging platform has second charging terminal and contains at least second charging slot for fittedly and adjustably receiving another of said first and said second rechargeable battery in said second charging slot, wherein said second charging terminal is for electrically connecting with at least one battery terminal of said corresponding rechargeable battery; and
   a charging circuitry disposed in said charging housing to electrically connect with said first and said second charging terminals, wherein said first and said second rechargeable battery are fittedly and detachably disposed in said first and said second charging slots for being simultaneously or individually recharged, wherein said first and said second charging slots are formed within said retention cavity for fittedly yet adjustably receiving said first rechargeable battery and said second rechargeable battery within said first and said second charging slots respectively, wherein said adjustable charging arrangement further comprises a retention arrangement formed on two inner sidewalls of said retention cavity for retaining said first rechargeable battery within said first charging slot without falling onto said lower charging platform,
   wherein said retention arrangement contains at least first and second retention surfaces inwardly extended at said first and second sidewall of said retention cavity wherein two side end portions of said first rechargeable battery are arranged to be placed onto said two retention surfaces respectively for being held in position within said first charging slot and without falling onto said lower charging platform,
   wherein a length of an upper portion of said retention cavity is longer than a length of an lower portion of said retention cavity so as to form a first shoulder between said upper portion and said lower portion of said retention cavity at said first sidewall thereof, wherein said first retention surface is formed as an upper surface of said first shoulder for supporting said corresponding end portion of said first rechargeable battery,
   wherein said upper charging platform further comprises an adjusting member slidably mounted at said top charging side of said charger housing to slidably adjust a size of said first charging slot for fittedly receiving said first rechargeable battery, wherein said adjusting member is slidably mounted on said top charging side of said charger housing in such a manner that said adjusting member is capable of slidably displacing between an idle position and a charging position, wherein in said idle position, said adjusting member is inwardly slid to reduce a size of said first charging slot to its minimum and to minimize an overall size of said adjustable charger, wherein in said charging position, said adjusting member is outwardly slid on said top charging side of said charger housing to increase a size of said first charging slot for fittedly receiving said corresponding first rechargeable battery, and to form a second shoulder of said retention cavity, wherein said second retention surface is formed as an upper surface of said second shoulder for supporting said corresponding end portion of said first rechargeable battery.

2. The adjustable charger, as recited in claim 1, wherein said upper charging platform further comprises a terminal adjusting arrangement provided on said charger housing for adjustably aligning said first charging terminals with said battery terminal of said first rechargeable battery.

3. The adjustable charger, as recited in claim 2, wherein said terminal adjusting arrangement contains first sliding track formed on a bottom surface of said retention cavity, and comprises first terminal holder slidably mounted on said first sliding track, wherein said first charging terminal is movably mounted to said first terminal holder so as to slidably displace along said first sliding track for aligning with said battery terminal of said first rechargeable battery.

4. The adjustable charger, as recited in claim 3, wherein said terminal adjusting arrangement contains second sliding track formed on said first sidewall of said retention cavity, and comprises second terminal holder slidably mounted on said second sliding track, wherein said second charging terminal is movably mounted to said second terminal holder so as to slidably displace along said second sliding track for aligning with said battery terminal of said first rechargeable battery.

5. The adjustable charger, as recited in claim 2, wherein said lower charging platform further contains a third charging slot formed side-by-side with said second charging slot for receiving a third rechargeable battery, wherein said adjusting member comprises an adjusting cover having a curved top panel, two side panels, an inner panel and an outer panel downwardly and integrally extended from peripheral side edges of said curved top panel to form a substantially hollow structure within said adjusting member, wherein said adjusting member further has a predetermined number of passage slots formed on said inner panel to align with said second and third charging slots so that said second and said third rechargeable batteries are disposed into said second and said third charging slots and pass through said corresponding passage slots without being blocked by said inner panel of said adjusting member respectively, so that said adjusting member is arranged to slide on said top charging side of said charger housing at a position above said second and said third rechargeable batteries.

6. The adjustable charger, as recited in claim 3, wherein said lower charging platform further contains a third charging slot formed side-by-side with said second charging slot for receiving a third rechargeable battery, wherein said adjusting member comprises an adjusting cover having a curved top panel, two side panels, an inner panel and an outer panel downwardly and integrally extended from peripheral side edges of said curved top panel to form a substantially hollow structure within said adjusting member, wherein said adjusting member further has a predetermined number of passage slots formed on said inner panel to align with said second and third charging slots so that said second and said third rechargeable batteries are disposed into said second and said third charging slots and pass through said corresponding passage slots without being blocked by said inner panel of said adjusting member respectively, so that said adjusting member is arranged to slide on said top charging side of said charger housing at a position above said second and said third rechargeable batteries.

7. The adjustable charger, as recited in claim 4, wherein said lower charging platform further contains a third charging slot formed side-by-side with said second charging slot for receiving a third rechargeable battery, wherein said adjusting member comprises an adjusting cover having a curved top panel, two side panels, an inner panel and an outer panel downwardly and integrally extended from peripheral side edges of said curved top panel to form a substantially hollow structure within said adjusting member, wherein said adjusting member further has a predetermined number of passage slots formed on said inner panel to align with said second and third charging slots so that said second and said third rechargeable batteries are disposed into said second and said third charging slots and pass through said corresponding passage slots without being blocked by said inner panel of said adjusting member respectively, so that said adjusting member is arranged to slide on said top charging side of said charger housing at a position above said second and said third rechargeable batteries.

8. The adjustable charger, as recited in claim 5, wherein said adjustable charging arrangement further comprises a display provided on said charger housing and electrically connected with said charging circuitry for displaying a charging status of said first through third rechargeable batteries.

9. The adjustable charger, as recited in claim 6, wherein said adjustable charging arrangement further comprises a display provided on said charger housing and electrically connected with said charging circuitry for displaying a charging status of said first through third rechargeable batteries.

10. The adjustable charger, as recited in claim 7, wherein said adjustable charging arrangement further comprises a display provided on said charger housing and electrically connected with said charging circuitry for displaying a charging status of said first through third rechargeable batteries.

11. The adjustable charger, as recited in claim 7, further comprising a USB charging arrangement provided on said charger housing for allowing said charging circuitry to acquire electricity via a conventional USB port, wherein said charging circuitry is adapted to raise a voltage of a typical USB electrical supply voltage of approximately 4.2V to approximately 5.5V for charging said first rechargeable battery having similar voltage capacity.

12. The adjustable charger, as recited in claim 10, further comprising a USB charging arrangement provided on said charger housing for allowing said charging circuitry to acquire electricity via a conventional USB port, wherein said charging circuitry is adapted to raise a voltage of a typical USB electrical supply voltage of approximately 4.2V to approximately 5.5V for charging said first rechargeable battery having similar voltage capacity.

13. The adjustable charger, as recited in claim 7, wherein said adjustable charging arrangement further has a plurality of additional charging slots formed on said bottom standing side of said charger housing for fittedly receiving and charging additional rechargeable batteries.

14. The adjustable charger, as recited in claim 10, wherein said adjustable charging arrangement further has a plurality of additional charging slots formed on said bottom standing side of said charger housing for fittedly receiving and charging additional rechargeable batteries.

15. The adjustable charger, as recited in claim 12, wherein said adjustable charging arrangement further has a plurality of additional charging slots formed on said bottom standing side of said charger housing for fittedly receiving and charging additional rechargeable batteries.

* * * * *